United States Patent [19]

Kuznicki

[11] Patent Number: 4,938,939
[45] Date of Patent: Jul. 3, 1990

[54] PREPARATION OF SMALL-PORED CRYSTALLINE TITANIUM MOLECULAR SIEVE ZEOLITES

[75] Inventor: Steven M. Kuznicki, Easton, Pa.

[73] Assignee: Engelhard Corporation, Edison, N.J.

[21] Appl. No.: 449,032

[22] Filed: Dec. 11, 1989

Related U.S. Application Data

[63] Continuation-in-part of Ser. No. 94,233, Sep. 8, 1987, abandoned.

[51] Int. Cl.$^5$ .............................................. C01B 33/20
[52] U.S. Cl. .................................................... 423/326
[58] Field of Search ............... 423/325, 326, 328, 329, 423/330; 502/208, 64, 66

[56] References Cited

U.S. PATENT DOCUMENTS

| | | | |
|---|---|---|---|
| 3,329,482 | 7/1967 | Young | 423/326 |
| 4,329,328 | 5/1982 | McAnespie et al. | 423/326 |
| 4,500,651 | 2/1985 | Lok et al. | 502/208 |
| 4,623,526 | 11/1986 | Leen | 423/326 |
| 4,666,692 | 5/1987 | Taramasso et al. | 423/326 |
| 4,705,675 | 11/1987 | Desmond et al. | 423/326 |
| 4,707,345 | 11/1987 | Lok et al. | 423/326 |
| 4,711,869 | 12/1987 | Cullo et al. | 423/326 |
| 4,828,812 | 5/1989 | McCullen et al. | 423/326 |

OTHER PUBLICATIONS

Sandomirskii et al., "The OD Structure of Zorite", Sov. Phys. Crystallogr. 24(6) 1979, pp. 686–692.

Primary Examiner—John Doll
Assistant Examiner—R. Bruce Breneman

[57] ABSTRACT

A process for producing new crystalline titanium molecular sieve zeolite compositions having a pore size of about 3–5 Angstrom Units is disclosed.

9 Claims, No Drawings

PREPARATION OF SMALL-PORED CRYSTALLINE TITANIUM MOLECULAR SIEVE ZEOLITES

CROSS-REFERENCE TO RELATED CASES

This application is a continuation-in-part of Ser. No. 094,233, filed Sept. 8, 1987, now abandoned.

BACKGROUND OF THE INVENTION

1. Field of the Invention

This invention relates to methods for preparing new crystalline titanium molecular sieve zeolite compositions.

2. Background of the Invention and Prior Art

Since the discovery by Milton and coworkers (U.S. Pat. Nos. 2,882,243 and 2,882,244) in the late 1950's that aluminosilicate systems could be induced to form uniformly porous, internally charged crystals, analogous to molecular sieve zeolites found in nature, the properties of synthetic aluminosilicate zeolite molecular sieves have formed the basis of numerous commercially important catalytic, adsorptive and ion-exchange applications. This high degree of utility is the result of a unique combination of high surface area and uniform porosity dictated by the "framework" structure of the zeolite crystals coupled with the electrostatically charged sites induced by tetrahedrally coordinated $Al^{+3}$. Thus, a large number of "active" charged sites are readily accessible to molecules of the proper size and geometry for adsorptive or catalytic interactions. Further, since charge compensating cations are electrostatically and not covalently bound to the aluminosilicate framework, they are generally base exchangeable for other cations with different inherent properties. This offers wide latitude for modification of active sites whereby specific adsorbents and catalysts can be tailormade for a given utility.

In the publication "Zeolite Molecular Sieves", Chapter 2, 1974, D. W. Breck hypothesized that perhaps 1,000 aluminosilicate zeolite framework structures are theoretically possible, but to date only approximately 150 have been identified. While compositional nuances have been described in publications such as U.S. Pat. Nos. 4,524,055, 4,603,040 and 4,606,899, totally new aluminosilicate framework structures are being discovered at a negligible rate.

With slow progress in the discovery of new aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials.

It has been believed for a generation that phosphorus could be incorporated, to varying degrees, in a zeolite type aluminosilicate framework. In the more recent past (JACS 104 pp. 1146 (1982); Proceedings of the 7th International Zeolite Conference, pp. 103-112, 1986) E. M. Flanigan and coworkers have demonstrated the preparation of pure aluminophosphate based molecular sieves of a wide variety of structures. However, the site inducing $Al^{+3}$ is essentially neutralized by the $P^{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of them suffer either from the site removing effect of incorporated $P^{+5}$ or the site diluting effect of incorporating effectively neutral tetrahedral +4 metal into an aluminosilicate framework. As a result, extensive research in the research community has failed to demonstrate significant utility for any of these materials.

A series of zeolite-like "framework" silicates have been synthesized, some of which have larger uniform pores than are observed for aluminosilicate zeolites. (W. M. Meier, Proceedings of the 7th International Zeolite Conference, pp. 13-22 (1986).) While this particular synthesis approach produces materials which, by definition, totally lack active, charged sites, back implementation after synthesis would not appear out of the question although little work appears in the open literature on this topic.

Another and most straightforward means of potentially generating new structures or qualitatively different sites than those induced by aluminum would be the direct substitution of some charge inducing species for aluminum in a zeolite-like structure. To date the most notably successful example of this approach appears to be boron in the case of ZSM-5 analogs, although iron has also been claimed in similar materials. (EPA 68,796 (1983), Taramasso et al; Proceedings of the 5th International Zeolite Conference; pp. 40-48 (1980)); J. W. Ball et al; Proceedings of the 7th International Zeolite Conference; pp. 137-144 (1986); U.S. Pat. No. 4,280,305 to Kouenhowen et al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titaniumsilicates under conditions similar to aluminosilicate zeolite formation was possible if the titanium was present as a "critical reagent" +III peroxo species. While these materials were called "titanium zeolites" no evidence was presented beyond some questionable X-ray diffraction (XRD) patterns and his claim has generally been dismissed by the zeolite research community. (D. W. Breck, Zeolite Molecular Sieves, p. 322 (1974); R. M. Barrer, Hydrothermal Chemistry of Zeolites, p. 293 (1982); G. Perego et al, Proceedings of 7th International Zeolite Conference, p. 129 (1986).) For all but one end member of this series of materials (denoted TS materials), the presented XRD patterns indicate phases too dense to be molecular sieves. In the case of the one questionable end member (denoted TS-26), the XRD pattern might possible be interpreted as a small pored zeolite, although without additional supporting evidence, it appears extremely questionable.

A naturally occurring alkaline titanosilicate identified as "Zorite" was discovered in trace quantities on the Siberian Tundra in 1972 (A. N. Mer'kov et al; Zapiski Vses Mineralog. Obshch., pages 54-62 (1973)). The published XRD pattern was challenged and a proposed structure reported in a later article entitled "The OD Structure of Zorite", Sandomirskii et al, Sov. Phys. Crystallogr. 24 (6), Nov-Dec 1979, pages 686-693.

No further reports on "titanium zeolites" appeared in the open literature until 1983 when trace levels of tetrahedral Ti(IV) were reported in a ZSM-5 analog. (M. Taramasso et al; U.S. Pat. No. 4,410,501 (1983); G. Perego et al; Proceedings of the 7th International Zeolite Conference; p. 129 (1986).) A similar claim appeared from researchers in mid-1985 (EPA 132,550 (1985).) More recently, the research community reported mixed aluminosilicate-titanium(IV) (EPA 179,876 (1985); EPA 181,884 (1985)) structures which, along with TAPO (EPA 121,232 (1985)) systems, appear to have no possibility of active titanium sites. As such, their utility is highly questionable.

That charge bearing, exchangeable titanium silicates are possible is inferred not only from the existence of exchangeable alkali titanates and the early work disclosed in U.S. Pat. No. 3,329,481 on ill defined titaniumsilicates but also from the observation (S. M. Kuznicki et al; J. Phys. Chem.; 84; pp. 535-537 (1980)) of $TiO_4$- units in some modified zeolites.

SUMMARY OF THE INVENTION

The present invention relates to a method of preparation of a new family of stable, small-pore crystalline titaniumsilicate molecular sieve zeolites, hereinafter designated ETS-4. ETS-4 can be used as adsorbents and catalysts for the conversion of compounds of small molecular diameter. Additionally, these materials can be used as scavengers for ions of certain divalent metals such as mercury and lead.

DETAILED DESCRIPTION OF THE INVENTION

The present invention relates to a new family of stable crystalline titaniumsilicate molecular sieve zeolites which have a pore size of approximately 3-4 Angstrom units and a titania/silica mole ratio in the range of from 1.0 to 10. These titanium silicates have a definite X-ray diffraction pattern unlike other molecular sieve zeolites and can be identified in terms of mole ratios of oxides as follows:

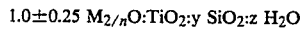

1.0±0.25 $M_{2/n}O:TiO_2:y$ $SiO_2:z$ $H_2O$ wherein M is at least one cation having a valence of n, y is from 1.0 to 10.0, and z is from 0 to 100. In a preferred embodiment, M is a mixture of alkali metal cations, particularly sodium and potassium, and y is at least 2.5 and ranges up to about 5.

The original cations M can be replaced at least in part with other cations by well known exchange techniques. Preferred replacing cations include hydrogen, ammonium rare earth, and mixtures thereof. Members of the family of molecular sieve zeolites designated ETS-4 in the rare earth-exchanged form have a high degree of thermal stability of at least 450° C. or higher depending on cationic form, thus rendering them effective for use in high temperature catalytic processes. ETS zeolites are highly adsorptive toward molecules up to approximately 3-5 Angstroms in critical diameter, e.g., water, ammonia, hydrogen sulfide, $SO_2$ and n-hexane and are essentially non-adsorptive toward molecules which are larger than 5 Angstroms in critical diameter.

Members of the ETS molecular sieve zeolites have an ordered crystalline structure and an X-ray powder diffraction pattern having the following significant lines:

TABLE 1

| XRD POWDER PATTERN OF ETS-4 (0–40° 2 theta) | |
|---|---|
| SIGNIFICANT d-SPACING (ANGS.) | $I/I_o$ |
| 11.65 ± 0.25 | S-VS |
| 6.95 ± 0.25 | S-VS |
| 5.28 ± .15 | M-S |
| 4.45 ± .15 | W-M |
| 2.98 ± .05 | VS |

In the above table,
VS=50-100
S=30-70
M=15-50
W=5-30

The above values and values later mentioned were collected using standard techniques on a Phillips APD3720 diffractometer equipped with a theta compensator. The theta compensator maintains a constant area of illumination on the sample, so X-ray intensities obtained from a theta compensated unit are not directly comparable to those of a non-compensated unit. Thus, all values mentioned in the specification and claims with regard to ETS-4 were determined by said theta compensated X-ray equipment. The radiation was the K-alpha doublet of copper, and a scintillation counter spectrometer was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. It should be understood that this X-ray diffraction pattern is characteristic of all the species of ETS-4 compositions. Ion exchange of the sodium ion and potassium ions with cations reveals substantially the same pattern with some minor shifts in interplanar spacing and variation in relative intensity. Other minor variations can occur depending on the silicon to titanium ratio of the particular sample, as well as if it had been subjected to thermal treatment. Various cation exchanged forms of ETS-4 have been prepared and their X-ray powder diffraction patterns contain the most significant lines set forth in Table 1.

ETS-4 molecular sieve zeolites can be prepared from a reaction mixture containing a titanium source such as titanium trichloride, a source of silica, a source of alkalinity such as an alkali metal hydroxide, water and, optionally, an alkali metal fluoride having a composition in terms of mole ratios falling within the following ranges.

TABLE 2

|  | Broad | Preferred | Most Preferred |
|---|---|---|---|
| $SiO_2/Ti$ | 1-10 | 1-10 | 2-3 |
| $H_2O/SiO_2$ | 2-100 | 5-50 | 10-25 |
| $Mn/SiO_2$ | 0.1-10 | .5-5 | 1-3 | wherein M indicates the cations of valence n derived from the alkali metal hydroxide and potassium fluoride and/or alkali metal salts used for preparing the titanium silicate according to the invention. The reaction mixture is heated to a temperature of from about 100° C. to 300° C. for a period of time ranging from about 8 hours to 40 days, or more. The hydrothermal reaction is carried out until crystals are formed and the resulting crystalline product is thereafter separated from the reaction mixture, cooled to room temperature, filtered and water washed. The reaction mixture can be stirred although it is not necessary. It has been found that when using gels, stirring is unnecessary but can be employed. When using sources of titanium which are solids, stirring is beneficial. The preferred temperature range is 100° C. to 175° C. for a period of time ranging from 12 hours to 15 days. Crystallization is performed in a continuous or batchwise manner under autogeneous pressure in an autoclave or static bomb reactor. Following the water washing step, the crystalline ETS-4 is dried at temperatures of 100 to 400° F. for periods ranging up to 30 hours.

The method for preparing ETS-4 compositions comprises the preparation of a reaction mixture constituted by sources of silica, sources of titanium, sources of alkalinity such as sodium and/or potassium oxide and water having a reagent molar ratio composition as set forth in Table 2. Optionally, sources of fluoride such as potassium fluoride can be used, particularly to assist in solubilizing a solid titanium source such as $Ti_2O_3$. However, when titanium silicates are prepared from gels, its value is greatly diminished.

The silica source includes most any reactive source of silicon such as silica, silica hydrosol, silica gel, silicic acid, alkoxides of silicon, alkali metal silicates, preferably sodium or potassium, or mixtures of the foregoing.

The titanium oxide source is a trivalent titanium compound such as titanium trichloride, $TiCl_3$.

The source of alkalinity is preferably an aqueous solution of an alkali metal hydroxide, such as sodium hydroxide, which provides a source of alkali metal ions for maintaining electrovalent neutrality and controlling the pH of the reaction mixture within the range of 10.45 to 11.0±.1. As shown in the examples hereinafter, pH is critical for the production of ETS-4. The alkali metal hydroxide serves as a source of sodium oxide which can also be supplied by an aqueous solution of sodium silicate.

It is to be noted that at the lower end of the pH range, a mixture of titanium zeolites tends to form while at the upper end of the pH range, quartz appears as an impurity.

The titanium silicate molecular sieve zeolites prepared according to the invention contain no deliberately added alumina, and may contain very minor amounts of $Al_2O_3$ due to the presence of impurity levels in the reagents employed, e.g., sodium silicate, and in the reaction equipment. The molar ratio of $SiO_2/Al_2O_3$ will be 0 or higher than 5000 or more.

The crystalline titanium silicate as synthesized can have the original components thereof replaced by a wide variety of others according to techniques well known in the art. Typical replacing components would include hydrogen, ammonium, alkyl ammonium and aryl ammonium and metals, including mixtures of the same. The hydrogen form may be prepared, for example, by substitution of original sodium with ammonium. The composition is then calcined at a temperature of, say, 1000° F. causing evolution of ammonia and retention of hydrogen in the composition, i.e., hydrogen and/or decationized form. Of the replacing metals, preference is accorded to metals of Groups II, IV and VIII of the Periodic Table, preferably the rare earth metals.

The crystalline titanium silicates are then preferably washed with water and dried at a temperature ranging from 150° F. to about 600° F. and thereafter calcined in air or other inert gas at temperatures ranging from 500° F. to 1500° F. for periods of time ranging from 1 to 48 hours or more.

Regardless of the synthesized form of the titanium silicate the spatial arrangement of atoms which form the basic crystal lattices remain essentially unchanged by the replacement or sodium or other alkali metal or by the presence in the initial reaction mixture of metals in addition to sodium, as determined by an X-ray powder diffraction pattern of the resulting titanium silicate. The X-ray diffraction patterns of such products are essentially the same as those set forth in Table I above.

The crystalline titanium silicates prepared in accordance with the invention are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The titanium silicate can be extruded before drying or dried or partially dried and then extruded.

When used as a catalyst, it is desired to incorporate the new crystalline titanium silicate with another material resistant to the temperatures and other conditions employed in organic processes. Such materials include active and inactive materials and synthetic and naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new crystalline titanium silicate, i.e., combined therewith which is active, tends to improve the conversion and/or selectivity of the catalyst in certain organic conversion processes such as the cracking of n-hexane. Inactive materials suitably serve as diluents to control the amount of conversion in a given process so that products can be obtained economically and in an orderly manner without employing other means for controlling the rate of reaction. Normally, crystalline materials have been incorporated into naturally occurring clays, e.g., bentonite and kaolin to improve the crush strength of the catalyst under commercial operating conditions. These materials, i.e., clays, oxides, etc., function as binders for the catalyst. It is desirable to provide a catalyst having good crush strength because in a petroleum refinery the catalyst is often subjected to rough handling which tends to break the catalyst down into powder-like materials which cause problems in processing. These clay binders have been employed for the purpose of improving the crush strength of the catalyst.

Naturally occurring clays that can be composited with the crystalline titanium silicate described herein include the montmorillonite and kaolin family, which families include the sub-bentonites and the kaolins known commonly as Dixie, McNamee, Georgia and Florida or others in which the main constituent is halloysite, kaolinite, dickite, nacrite or anauxite. Such clays can be used in the raw state as originally mined or initially subjected to calcination, acid treatment or chemical modification.

In addition to the foregoing materials, the crystalline titanium silicate may be composited with a porous matrix material such as silica-alumina, silica-magnesia, silica-zirconia, silica-thoria, silica-berylia, silica-titania as well as ternary compositions such as silica-aluminathoria, silica-alumina-zirconia, silica-alumina-magnesia and silica-magnesia-zirconia. The matrix can be in the form of a cogel. The relative proportions of finally divided crystalline metal organosilicate and inorganic oxide gel matrix can vary widely with the crystalline organosilicate content ranging from about 1 to 90 percent by weight and more usually in the range of about 2 to about 50 percent by weight of the composite.

As is known in the art, it is desirable to limit the alkali metal content of materials used for acid catalyzed reactions. This is usually accomplished by ion exchange with hydrogen ions or precursors thereof such as ammonium and/or metal cations such as rare earth.

In order to more fully illustrate the nature of the invention and a manner of practicing the same, the following examples illustrate the best mode now contemplated.

Examples 1-3 represent runs outside the scope of this invention serving to illustrate the criticality of pH.

Because of the difficulty of measuring pH during crystallization, it is to be understood that the term pH as used in the specification and claims refers to the pH of the reaction mixture before crystallization diluted 100:1 by volume with water and equilibrated for 1 minute.

EXAMPLE 1

The following reactants were blended in a Waring Blendor$^R$ mixer:

10.40 grams of sodium silicate (28.7% $SiO_2$, 8.9% $Na_2O$)
3.55 grams of titaniumesquioxide ($Ti_2O_3$)
9.00 grams NaOH
4.20 grams KOH
4.70 grams $KF.2H_2O$
Additional water added to a total of 54.0 grams
Such that:
Ti/Si=1
Na+K/Si=3
[OH]$^-$/Si=3
$H_2O$/Si=60
[OH]$^-$/$H_2O$=10

After blending, the $Ti_2O_3$ appeared insoluble and settled from the solution, no titanium-silicate gel complex being evident. The pH at this point was 12.2±0.1. After autoclaving under autogenous pressure for 7 days at 125° C., a clearly crystalline phase (dubbed ETS-1) was observed. Attempts at shorter reaction times resulted in only partially crystalline phases. This phase demonstrated the following X-ray (XRD) powder pattern:

| d-spacing (A) | I/I$_o$ |
| --- | --- |
| 7.80 | 100 |
| 7.16 | 5 |
| 4.69 | 5 |
| 4.47 | 5 |
| 3.90 | 15 |
| 3.39 | 5 |
| 3.20 | 30 |
| 3.03 | 5 |
| 2.60 | 35 |
| 2.45 | 15 |
| 2.38 | 10 |
| 1.97 | 10 |
| 1.95 | 20 |
| 1.90 | 15 |

While the products produced by Young (U.S. Pat. No. 3,329,481) were claimed to be amorphous or of poor crystallinity, it should be noted that the two largest XRD peaks reported by Young for a material dubbed TS-26 are circa 7.8A and 3.2A consistent with the first and third strongest peaks. While significant differences exist, product elemental composition is identical (within experimental error) with that reported for TS-26 (Ti/Si slightly greater than 1. It is probably that XRD differences represent contaminants in Young's "poorly crystalline" sample and that the material represented in Example 1 represents a pure, highly crystalline form of TS-26.

TS-26 is important in that the XRD pattern is the only of Young's "titanium zeolites" which demonstrates d-spacings large enough to be a zeolite, albeit small pored. This material, while exchangeable, is of low thermal stability and the series of apparent plainer reflections in the XRD pattern (strongest peak by far is the lead peak at 7.8A, 7.8/2=3.9 where a strong peak is noted, 7.8/3=2.6 where a strong peak is noted and 7.8/4=1.95 where a strong peak is noted) all are consistent with a layered titanate. No molecular sieving has been noted for this material or demonstrated for TS-26 by Young.

EXAMPLE 2

The experiment of Example 1 was repeated but with aqueous $TiCl_3$ utilized as the titanium source. Additional caustic as sodium and/or potassium hydroxide was added to the silica source prior to the addition of titanous chloride to compensate for the acid used to stabilize the titanous chloride. The pH was the same as Example 1.

Upon mixing in a Waring blender, a deep purple, apparently homogeneous titanium-silicate gel formed which upon autoclaving for 1 day at 125° C. resulted in a highly crystalline product essentially identical to that of Example 1. Owing to either the greater dispersion of titanium or the preformation of a titanium-silicate complex, reaction proceeded at a significantly accelerated rate versus the employment of the sparingly soluble titanium ($Ti_2O_3$) source of Example 1.

EXAMPLE 3

Example 1 was repeated with the exception that potassium was removed from the system by substituting 12 grams of NaOH for the previously employed 9 grams of NaOH+4.2 grams of KOH and 4.2 grams of NaF was substituted for the 4.7 grams of $KF.2H_2O$. The pH was 12.2±1. After autoclaving as specified in Example 1, a crystalling product was obtained with 3 strong XRD peaks in the region of 2 theta=2.40°.

| d-spacing | I/I$_o$ |
| --- | --- |
| 8.75 | 85 |
| 3.70 | 40 |
| 3.16 | 100 |

This material dubbed ETS-2 essentially devoid of silica, while possessing larger d-spacings than ETS-1/TS-26, demonstrates the broad peaks, few in number, which are characteristic of a layered structure. The material produced by this example demonstrates low thermal stability, exchange behavior and lack of noted molecular sieving properties which are very similar to ETS-1/TS-26.

CONCLUSIONS FROM EXAMPLES 1-3

(1) The materials disclosed by Young as "titanium zeolites" are most probably layered titanates and not molecular sieves; (2) such materials may in fact be produced without the "critical reagent" previously required and in some cases do not even require the preparation of a titanium-silicate gel, but (3) titanium silicate gels significantly accelerate the formation of these materials; and (4) appropriate gels may easily be prepared by the precipitation of octahedrally coordinated titanium in basic silica solutions (such that the total base more than neutralizes the acid present in titanium reagents) using common titanium sources such as aqueous titanous chloride. The pH in all cases is extremely high relative to that used in the instant system.

EXAMPLE 4

This example will illustrate the preparation of the novel small-pored titanium silicate molecular sieve of this invention.

62.8 grams of N-grade sodium silicate (28.7% $SiO_2$)
40.8 grams 20% $TiCl_3$ solution (also 20% in HCL)
11.4 grams NaOH (added to sodium silicate)
9.4 grams $KF.2H_2O$ Such that:
Si/Ti=approximately 5.67
Na+K/Si=approximately 1.88
Initial $[OH]^-$/Si=approximately 0.2
Calculated $[OH^-]$/Si=approximately 0.2
$H_2O$//Si=approximately 60

The pH was 10.45±.1.

Autoclaving without stirring under autogenous pressure at 150° C. for 7 days resulted in the formation of a highly crystalline phase dubbed ETS-4 (where Si/Ti=approximately 2.6 and Na+K/Ti=1.5-2.0). Whose XRD pattern is represented by:

| d-spacing | $I/I_o$ |
|---|---|
| 11.6 | 45 |
| 6.9 | 95 |
| 5.27 | 35 |
| 4.45 | 25 |
| 3.61 | 25 |
| 3.45 | 50 |
| 3.38 | 35 |
| 3.066 | 95 |
| 2.979 | 100 |
| 2.902 | 55 |
| 2.763 | 20 |
| 2.641 | 25 |
| 2.587 | 60 |
| 2.506 | 10 |
| 2.426 | 20 |

EXAMPLE 5

This example illustrates the preparation of a large-pored zeolite described and claimed in copending application U.S. Pat. No. 4,853,202 entitled "Large-Pored Crystalline Titanium Molecular Sieve Zeolites," the disclosure of which is incorporated by reference. The mixture of Example 4 was duplicated with the exception that the added base was reduced to 8.95 grams (calculated to exactly compensate for the HCL stabilizing the aqueous titanous chloride) and the alkalinity of the mixture was solely due to that inherent from the sodium silicate. 1.23 grams of ETS-4 (Example 4) was added as seeds to stimulate the growth of crystalline species and the overall mixture's pH was approximately 10.2±.2. Upon reacting the mixture under conditions identical to Example 4, a new phase dubbed ETS-10 was observed which represents a large pored (8A), siliceous (Si/Ti=approximately 5) titanium-silicate classical molecular sieve whose XRD pattern is represented by:

| d-spacing | $I/I_o$ |
|---|---|
| 14.7 | 15 |
| 7.2 | 10 |
| 4.93 | 5 |
| 4.41 | 25 |
| 3.74 | 5 |
| 3.60 | 100 |
| 3.45 | 25 |
| 3.28 | 20 |
| 2.544 | 10 |
| 2.522 | 25 |
| 2.469 | 10 |

The above material had the following composition.
$SiO_2$: 63.5 wt.%
$TiO_2$: 17.8 wt. %
$Na_2O$: 11.4 wt.%
$K_2O$: 5.0 wt.%
Si/Ti ratio=4.75
Cationic charge/Ti=2.1

Numerous attempts to prepare titanium-silicate molecular sieves under acidic mixture conditions, even extremely mild, have failed to produce any encouraging crystalline phases.

EXAMPLE 6

The process of Example 4 is repeated but without the addition of potassium fluoride. A crystalline product is obtained having the XRD of Example 4.

EXAMPLE 7

The following reactants were blended:
502.4 grams of SDS* (sodium disilicate)
1.632 grams of $TiCl_3$(20% HCl)
71.2 grams of NAOH
75.2 grams of $KF.2H_2O$
44.0 grams of NACl
50.0 grams of $H_2O$
(*14 wt.% $Na_2O$; 26 wt.% Bal $H_2O$)

The pH of the blended reactants was 11.0±0.1.

After autoclaving for 6 days at 175° C. under autogenous pressure, a crystalline titanium silicate zeolite having the same XRD as that of Example 4 was obtained.

EXAMPLE 8

The following reactants were blended:
62.8 grams sodium silicate (N-Brand ®)
40.8 grams $TiCl_3$ (20% solution)
9.35 grams NaOH
9.40 grams $KF.2H_2O$ The pH of the reaction mixture was about 10.7.

After autoclaving for 10 days at 150° C. at autogenous pressure, a crystalline titanium silicate zeolite was obtained.

The XRD of the ETS-4 is compared with the XRD of the natural mineral zorite obtained from Lovozero Massif, Kola Peninsula, USSR.

TABLE 3

COMPARATIVE XRD PATTERNS FOR ZORITE AND ETS-4
(0°–40° 2 Theta)

| ZORITE* | | ETS-4* | |
|---|---|---|---|
| MAJOR d-SPACING (Angs.) | $I/I_o$ | MAJOR d-SPACING (Angs.) | $I/I_o$ |
| 11.6 | 30 | 11.6 | 45 |
| 6.9 | 100 | 6.9 | 95 |
| 5.8 | 4 | 5.8 | 5 |
| 5.2 | 23 | 5.27 | 35 |
| 4.92 | — | 4.92 | — |
| 4.45 | 26 | 4.45 | 25 |
| 3.61 | 15 | 3.61 | 25 |
| 3.43 | 17 | 3.45 | 50 |
| 3.38 | 29 | 3.38 | 35 |
| 3.067 | 55 | 3.066 | 95 |
| 2.979 | 97 | 2.979 | 100 |
| 2.901 | 42 | 2.902 | 55 |
| 2.762 | 12 | 2.763 | 20 |
| 2.639 | 21 | 2.641 | 25 |
| 2.584 | 44 | 2.587 | 60 |
| 2.504 | 9 | 2.506 | 10 |
| 2.429 | 13 | 2.426 | 20 |

*Theta compensated

As can be seen from the comparative X-ray data in the above Table, there is a great similarity between the X-ray diffraction pattern of Zorite and ETS-4.

X-ray powder patterns of Zorite and ETS-4 where also compared on non-theta compensated X-ray equipment. The values are shown in Table 4.

TABLE 4

COMPARATIVE XRD PATTERNS FOR ZORITE AND ETS-4
(0°–40° 2 Theta)

| MAJOR d-SPACING (Angs.) | $I/I_o$ | MAJOR d-SPACING (Angs.) | $I/I_o$ |
|---|---|---|---|
| 11.6 | 52 | 11.6 | 82 |
| 6.9 | 100 | 6.9 | 100 |
| 5.8 | 3 | 5.8 | — |
| 5.2 | 21 | 5.27 | 22 |
| 4.92 | — | 4.92 | — |
| 4.45 | 25 | 4.45 | 13 |
| 3.61 | 7 | 3.61 | 15 |
| 3.43 | 9 | 3.45 | 12 |
| 3.38 | 21 | 3.38 | 14 |
| 3.067 | 24 | 3.066 | 35 |
| 2.979 | 63 | 2.979 | 44 |
| 2.901 | 24 | 2.902 | 24 |
| 2.762 | 10 | 2.763 | 9 |
| 2.639 | 9 | 2.641 | 8 |
| 2.584 | 33 | 2.587 | 17 |
| 2.504 | 3 | 2.506 | 4 |
| 2.429 | 9 | 2.426 | 7 |

As can be seen from the comparative X-ray data in the above Table, there is a great similarity between the X-ray diffraction pattern of Zorite and ETS-4 on non-theta compensated equipment.

EXAMPLE 9

A sample of the as-synthesized Na/K ETS-4, e.g., Example 7, was exchanged such that a preponderance of its original cationic content was replaced by repeated treatment with an aqueous solution of calcium ions or sodium ions. An example was also prepared which was only about 75% exchanged (¾) with potassium ions. The following are the X-ray diffraction patterns obtained for the various cationic forms.

TABLE 5

| Calcium | | Potassium | | Sodium | |
|---|---|---|---|---|---|
| d-spacing | $I/I_o$ | d-spacing | $I/I_o$ | d-spacing | $I/I_o$ |
| 2.97 | 100 | 2.99 | 100 | 2.98 | 100 |
| 4.44 | 33 | 4.46 | 19 | 4.45 | 30 |
| 5.25 | 35 | 5.29 | 21 | 5.28 | 39 |
| 6.92 | 87 | 6.97 | 57 | 6.96 | 83 |
| 11.51 | 69 | 11.68 | 35 | 11.65 | 57 |

As can be seen from the above X-ray diffraction, the cationic form of the various ETS-4 did not significantly alter their X-ray diffraction patterns and the characteristic 2.98±.05 line remains the strongest line. In addition, the sodium exchange material was analyzed with the following results on a solids basis.

$SiO_2$: 54.77 wt.%
$TiO_2$: 26.7 wt.%
$Na_2O$: 18.8 wt.%
$K_2O$: less than ½%
$Al_2O_3$: less than ½%
$Fe_2O_3$: less than ½%

EXAMPLE 10

Sorption measurements were carried out on various cationic forms of ETS-4.

The procedure involved activating a particular sample at elevated temperatures under vacuum for at least 2 hours. The sample was allowed to cool to room temperature and exposed to a potential sorbate at about 20 mm pressure. Sorption measurements were done on a McBain-Bakr balance. The following results were obtained.

| Sorbate | As-Synthesized | NA | CA |
|---|---|---|---|
| $H_2O$ | | 13.1 | 16 wt. % |
| n-hexane | | 0.6 | 4.1 |
| benzene | | .5 | 0 |
| $SO_2$ | | 0.2 | 12 |

From the above and other tests, the pore size of the novel materials of this invention are about 3–5 Angstroms.

EXAMPLE 11

This example will illustrate the effectiveness of ETS-4 for removal of mercury ions $Hg^{2+}$ from aqueous solutions. The test involved overnight exposure to solutions of varying $hg^{++}$ initial concentration. The results as well as control runs are shown below.

MERCURY REMOVAL BY ALUMINOSILICATE AND TITANIUM SILICATE MOLECULAR SIEVES

| MATERIAL | INITIAL $Hg^{2+}$ CONC. | FINAL $Hg^{2+}$ CONC. (PPM) |
|---|---|---|
| Zeolite A | .0001 N | 17.5 |
| Chabazite | .0001 N | <1 |
| ETS-4 | .0001 N | <<1 (Not detected) |
| Zeolite A | .001 N | 107.5 |
| Chabazite | .001 N | 92.5 |
| ETS-4 | .001 N | <<1 (Not detected) |
| Zeolite A | .01 N | 272.5 |
| Chabazite | .01 N | 82.5 |
| ETS-4 | .01 N | <1 |

What is claimed is:

1. A process for the preparation of a crystalline titaniumsilicate molecular sieve zeolite having a pore size of approximately 3-5 Anstrom units which comprises heating a reaction mixture containing a titanium source, a source of silica, a source of alkalinity, water and, optionally, an alkali metal fluoride having a composition in terms of mole ratios falling within the following ranges:

$SiO_2/Ti$: 1-10
$H_2O/SiO_2$: 2-100
$M_n/SiO_2$: 0.1-10 wherein M indicates the cations of valence n derived from the source of alkalinity and potassium fluoride to a temperature of from about 100° C. to 300° C. for a period of time ranging from about 8 hours to 40 days while controlling the pH within the range of 10.45–11.0±0.1, said crystalline titaniumsilicate having a composition in terms of mole ratios of oxides as follows:

$$1.0 \pm 0.25\ M_{2/n}O: TiO_2: y\ SiO_2: z\ H_2O$$

wherein M is at least one cation having a valence of n, y is from 1.0 to 100, and z is from 0 to 100 and characterized by an X-ray powder diffraction pattern having the lines and relative intensities set forth in Table I below:

TABLE 1

| d-SPACING (ANGS.) | $I/I_o$ |
|---|---|
| 11.65 ± 0.25 | S-VS |
| 6.95 ± 0.25 | S-VS |

TABLE 1-continued

| | d-SPACING (ANGS.) | $I/I_o$ |
|---|---|---|
| | 5.28 ± .15 | M-S |
| | 4.45 ± .15 | W-M |
| | 2.98 ± .05 | VS |
| Where, | | |
| | VS = 50–100 | |
| | S = 30–70 | |
| | M = 15–50 | |
| | W = 5–30 | |

2. The process of claim 1 wherein the reaction mixture has a composition in terms of mole ratios of oxides as follows:

$SiO_2/Ti$: 1-10
$H_2O/SiO_2$: 5-50
$M_n/SiO_2$: 0.5-5

3. The process of claim 1, wherein the reaction mixture has a composition in terms of mole ratios of oxides as follows:

$SiO_2/Ti$: 2-3
$H_2O/SiO_1$: 10-25
$M_n/SiO_2$: 1-3

4. The process of claim 1 wherein the source of alkalinity is an alkali metal hydroxide.

5. The process of claim 2 wherein the source of alkalinity is an alkali metal hydroxide.

6. The process of claim 3 wherein the source of alkalinity is an alkali metal hydroxide.

7. The process of claim 4 wherein the titanium source is $TiCl_3$.

8. The process of claim 5 wherein the titanium source is $TiCl_3$.

9. The process of claim 6 wherein the titanium source is $TiCl_3$.

* * * * *